United States Patent
Bhagwat

[19]

[11] Patent Number: 5,847,950
[45] Date of Patent: Dec. 8, 1998

[54] CONTROL SYSTEM FOR A POWER SUPPLY

[75] Inventor: Pradeep Madhav Bhagwat, Baltimore, Md.

[73] Assignee: Electronic Measurements, Inc., Neptum, N.J.

[21] Appl. No.: 802,171

[22] Filed: Feb. 19, 1997

[51] Int. Cl.⁶ .................................................. H02M 3/00
[52] U.S. Cl. ............................... 363/78; 363/50; 363/65
[58] Field of Search ................................ 363/16, 17, 55, 363/56, 65, 78, 79, 95, 98, 50

[56] References Cited

U.S. PATENT DOCUMENTS

| | | | |
|---|---|---|---|
| 3,784,893 | 1/1974 | Rando | 363/54 |
| 3,848,175 | 11/1974 | Demarest | 363/49 |
| 4,005,352 | 1/1977 | Kugler et al. | 363/26 |
| 4,523,267 | 6/1985 | Mehl | 363/87 |
| 4,827,392 | 5/1989 | Miguchi | 363/56 |
| 5,115,386 | 5/1992 | Shirahama et al. | 363/41 |
| 5,222,015 | 6/1993 | Nakagawa | 363/21 |

*Primary Examiner*—Adolf Berhane
*Attorney, Agent, or Firm*—Michaelson & Wallace; Peter L. Michaelson; John C. Pokotylo

[57] ABSTRACT

A power supply having a control system for permitting intelligent operation. The power supply: (i) is convenient, safe, and easy to program; (ii) is provided with a graceful shutdown in which output filter capacitor(s) are rapidly discharged while minimizing wasted energy; (iii) tracks and optimizes scheduled maintenance; (iv) permits two-way communication between the power supply and its controller; and/or (v) permits intelligent reconfiguration of a group of connected power supplies when one or more fails.

13 Claims, 8 Drawing Sheets

CONTROL SYSTEM FOR A POWER SUPPLY

BACKGROUND OF THE INVENTION a. Field of the Invention

The present invention concerns a control system for a power supply which includes previously unavailable features and performance capabilities.

b. Related Art

In the following, the term "power supply" (or "power processor") includes linear and switching (e.g., switch mode, resonant, quasi resonant, and phase shift resonant) power processors. They are used for voltage and/or current regulation, DC to DC or DC to AC power conversion, and power conditioning.

A first drawback of known power supplies is discussed here. Presently available "programmable" power supplies may be programmed (i.e., have one or more of their output characteristics altered) in basically three main ways. First, some programmable power supplies include a back panel having a terminal strip. By altering jumpers between terminals of the terminal strip and/or by connecting trim potentiometer, which hangs freely, to wires connected to the terminals of the terminal strip, one or more output characteristics of such programmable power supplies may be changed. With some power supplies, the jumpers are changed inside the chassis of the power supply. Programming power supplies in this way is often awkward, difficult, and even dangerous. Second, an external tunable voltage supply may be used to provide zero (0) to five (5) volts, for example, at negligible current load to terminals of a programmable power supply. This zero (0) to five (5) volt signal is amplified by the programmable power supply. Unfortunately, the power supply may be inadvertently controlled to exceed a desired limit. Third, a switch contact can be used to turn the power supply on or off. The switch contacts are connected by wires which are harnessed around the test assembly.

More sophisticated "programmable" power supplies have data bus inputs that can accept data from a local processor over a data bus (e.g., an RS-232). However, even these more sophisticated programmable power supplies act as "receive only" terminals. That is, such programmable power supplies are dumb terminals which can respond to external commands, but cannot initiate commands. Further, such power supplies cannot provide feedback or test monitoring signals.

Thus, a more easily programmable power supply is needed. Further, such a new programmable power supply should be able to communicate with its controller.

A second drawback of known power supplies is discussed here. Typically, power supplies have no special shut down capabilities. When power is interrupted, the voltage on a relatively large output capacitor(s) goes to zero at a rate which depends on the load. Often, it may be many seconds before the output capacitor(s) is discharged.

This relatively slow discharge of the output capacitor(s) of a power supply during a shut down may be unacceptable in some applications. For example, a 3.2 volt or 5 volt power supply having a huge output filter capacitor (e.g., 10 mf) is typically used to "burn-in" integrated circuits, such as CMOS integrated circuits. Many CMOS chips can go into "SCR latchup" if the input (or output) is driven beyond the supply, even momentarily. It is well known that CMOS chips have a parasitic SCR (or "silicon-controlled rectifier") structure. (See e.g., P. Horowitz and W. Hill, *The Art of Electronics*, 2d Ed., pp. 555 and 973, Cambridge University Press (1989). Although most CMOS circuits include an input and output protection circuit in which diodes clamp an input or output to supply voltages, a current of 50 mA or so can trigger the parasitic SCR into heavy conduction such that the supply voltage is shorted with ground, thereby destroying the chip within a few seconds. If the power supply is burning in hundreds or thousands of CMOS chips, the potential loss due to SCR latchup can be enormous. Additionally, wiring such a high power resistor across the output cup can introduce RF noise which is unacceptable for applications demanding low output noise. Thus, a graceful shutdown which rapidly discharges the output filter capacitor(s) is needed.

When supplying loads having a relatively low resistance, to discharge the voltage on the output filter capacitor(s) more rapidly, some have provided high power resistors across the output capacitors. Unfortunately, the provision of such high power resistors results in high power dissipation and wasted electrical energy. Additionally, wiring such a high power resistor across the output capacitor can cause RF noise to be introduced. Such RF noise is unacceptable for applications demanding low output noise. Thus, an improved way of rapidly discharging the output filter capacitor(s) of a power supply during shutdown is needed.

A third drawback of known power supplies is discussed here. Unfortunately, power supplies have a finite life. To extend the life of power supplies, routine maintenance is essential. For example, in power supplies used in industrial processes such as electroplating, reliable operation of the power supply is essential. To prolong the life, and ensure reliable operation, of such power supplies, parts, such as cooling fans and electrolytic capacitors must be replaced, elements, such as power semiconductors and heat sinks, must be cleaned and/or regreased with thermal joint compound, and corrosion on elements, such as bus bars, must be cleaned and removed.

Experts recognize that the aging process of a power supply is roughly a linear function of operating time, fraction of maximum power output at which the supply is operating, and environmental (or ambient) temperature. Unfortunately, tracking the time for preventative maintenance is a burdensome task. Further, optimizing the timing for maintenance is difficult. Thus, if parts are replaced or serviced before they are needed, time and materials are wasted, whereas, if parts are replaced or serviced too late, the life of the power supply is shortened. Thus, a power supply which tracks and optimizes scheduled maintenance is needed. The power supply will preferably indicate when maintenance is needed.

A final drawback of known power supplies is discussed here. In many applications (for example, in a high speed electroplating line), a large number of identical or similar power supplies are used. Connecting these power supplies together, for example in a daisy-chain configuration, is often required to provide more output power, perhaps in a distributed manner over loads having a large physical dimensions such as a plating line.

Unfortunately, when a single power supply fails, the operation of the remaining power supplies may become unstable, particularly if the remaining power supplies were "slaved" to a failed "master" power supply. Thus, a power supply is needed which can be connected with other power supplies and which facilitates an intelligent reconfiguration in the event of a failed power supply.

In view of the aforementioned problems associated with known power supplies, a power supply, having a control system for permitting intelligent operation of the power supply is highly desirable. Such a power supply should: (i) be convenient, safe, and easy to program; (ii) be provided with a graceful shutdown in which output filter capacitor(s) are rapidly discharged while minimizing wasted energy; (iii) track and optimize scheduled maintenance; (iv) permit two-way communication between the power supply and its controller; and/or (v) permit intelligent reconfiguration of a group of connected power supplies when one or more fails.

SUMMARY OF THE INVENTION

The present invention achieves the above listed goals by providing a programmable power converter including (a) a power converter for converting an input power to an output power, (b) a controller for controlling a gain of the power converter based on a sensed output of the power converter, (c) an input device receiving scaled analog inputs and control inputs, and (d) an output device providing scaled measurement analog outputs and monitor outputs.

The scaled analog inputs received by the input device may include a first scaled signal representing a desired output voltage, a second scaled signal representing an output voltage limit, a third scaled signal representing a desired output current, and a fourth scaled signal representing an output current limit. In a preferred embodiment of the present invention, each of the first, second, third, and fourth scaled analog inputs received by the input device vary between 0 and 5 volts. In an alternative embodiment of the present invention, the analog inputs received by the input device include (i) desired output voltage, (ii) desired output current, (iii) program read back voltage gain, (iv) program read back current gain, (v) output voltage limit, (vi) output current limit, (vii) output over-voltage limit, (viii) output power limit, and/or (ix) over-voltage.

The control inputs received by the input device may include a first ON/OFF signal for determining whether the first scaled signal is taken from a front panel setting or an external source, a second ON/OFF signal for determining whether the second scaled signal is taken from a front panel setting or the external source, a third ON/OFF signal for determining whether the third scaled signal is taken from a front panel setting or the external source, and a fourth ON/OFF signal for determining whether the fourth scaled signal is taken from a front panel setting or the external source.

The scaled measurement analog outputs provided by the output device may include a first scaled output representing output voltage and a second scaled output representing output current.

The monitor outputs provided by the output device may include PASS/FAIL or ON/OFF indications for (i) line brown out voltage, (ii) line frequency, (iii) line phase, (iv) neutral current, (v) temperature, (vi) local mode, (vii) remote mode, (viii) auto remote mode, (ix) RS232 interface, (x) IEEE488.2 interface, (xi) external analog voltage programming, (xii) external analog current programming, (xiii) master/slave condition, (xiv) voltage/current mode, and/or (xv) inverter temperature.

The output device preferably further provides GO/NO-GO indicator signals and display signals.

In a power supply having an output capacitor across which a load is coupled, the present invention provides a circuit for discharging the output capacitor. The circuit includes a series branch, coupled across the output capacitor, which includes a resistor and a controllable switch. The controllable switch has an open state under normal operation of the power supply and a closed state under a shutdown condition of the power supply, such that, under the shutdown condition of the power supply, charge built up on the output capacitor is dissipated via the resistor. The controllable switch may be a MOSFET. The resistor may be a high power resistor having a resistance of about 0.1 ohm. The circuit preferably further includes means for providing switching signals to the controllable switch.

The present invention also provides a method for maintaining a power supply, that method including steps of (a) receiving and storing temperature, average output power, and operating time from the power supply, (b) determining at least one maintenance factor from the stored temperature, average output power, and operating time, (c) comparing the at least one maintenance factor with an associated maintenance threshold, and (d) providing a message and/or an alarm when a maintenance factor is greater than its associated maintenance threshold. The method may also include a step of verifying the performance of a replacement and/or a maintenance operation.

To implement the method of maintaining a power supply, the programmable power converter of the present invention further includes (a) an input device for receiving temperature, average output power, and operating time from the power supply, (b) a storage device for storing the temperature, average output power, and operating time received from the input device, (c) a maintenance factor generator for determining at least one maintenance factor from the stored temperature, average output power, and operating time, (d) a comparison device for comparing the at least one maintenance factor with an associated maintenance threshold, and (e) an output device providing a message and/or an alarm when the at least one maintenance factor is greater than its associated maintenance threshold.

Lastly, the present invention provides a system of power converters for providing power to a load. The system of the present invention includes a plurality of power converters and a processor. Each of the power converters have (i) a positive output voltage terminal coupled with the load, (ii) a negative output voltage terminal coupled with the load, (iii) a master enable input for accepting a master enable signal corresponding to the particular power converter, (iv) a watchdog signal output, and (v) a programmable voltage input/output terminal for providing a scaled signal representing its output voltage if enabled as a master and for receiving a scaled signal representing a desired output voltage if a slave, and/or a programmable current input/output terminal for providing a scaled signal representing its output current if enabled as a master and for receiving a scaled signal representing a desired output current if a slave. The processor (i) receives a watchdog signal from each of the plurality of power converters, (ii) determines a next available master power converter based on the received watchdog signals, and (iii) provides master enable signals to each of the plurality of power converters. One of the master enable signals has a first state for enabling the power converter associated with it to act as a master, while the remaining master enable signals have a second state for making the power converters associated with these signals slaves.

The system of the present invention permits a graceful reconfiguration of the power converters as follows. If the watchdog signal output by the power converter enabled as the master indicates a failure, the processor (i) provides a master enable signal of the first state to the next available master power converter, and (ii) provides a master enable signal of the second state to the power converter previously enabled as the master.

BRIEF DESCRIPTION OF THE DRAWINGS

FIG. 6b is a simplified schematic of a portion of FIG. 6a.

DETAILED DESCRIPTION

Figure 1:
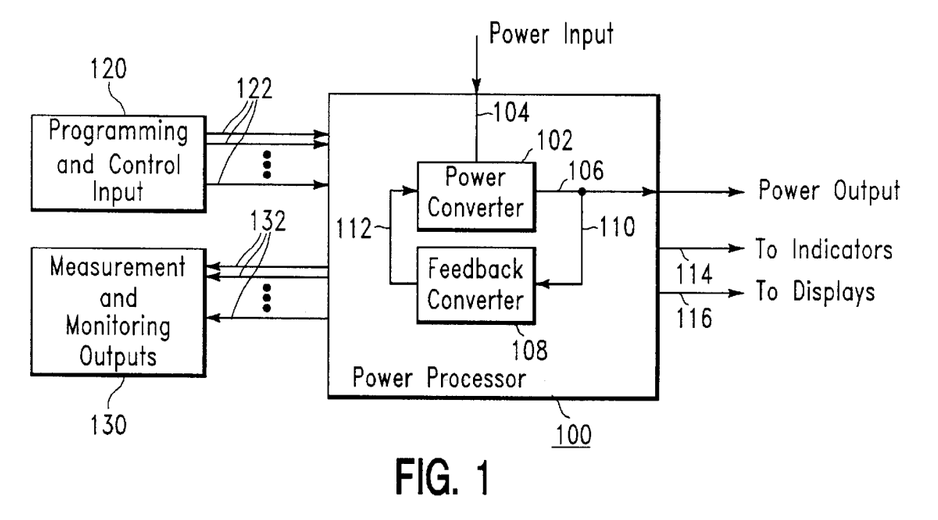
FIG. 1 is a high level block diagram of the power supply of the present invention.

FIG. 1 is a high level block diagram of the present invention. As shown in FIG. 1, the present invention includes a power processor 100 which includes a power converter 102 and a feedback controller 108. The power converter 102 (which may be a full-bridge DC-to-DC converter for example) converts an input power provided at line (or input voltage provided across lines) 104 to an output power provided at line (or to a load arranged between lines) 106. The feedback controller 108 receives, via line 110, a signal indicative of the power output on line(s) 106 and controls, via one or more lines 112, the operation of the power converter 102 such that its power output approaches a set-point value.

The power processor 100 receives programming and control inputs from an input device 120, such as an external computer or a front panel for example, via lines 122. The programming inputs are values scaled to zero (0) to five (5) volts, for example. The programming inputs may include one or more of the following:

Output Voltage Internal (from Front Panel);
Output Voltage External (from Host Computer);
Output Current Internal (from Front Panel);
Output Current External (from Host Computer);
Program Read Back Voltage Gain;
Program Read Back Current Gain;
Output Voltage Limit;
Output Current Limit;
Output Over Voltage Limit;
Output Power Limit;
Overvoltage Internal (from Front Panel); and/or
Overvoltage External (from Host Computer).

The Output Voltage (internal or external) signal determines the full scale value of the output voltage provided by the power converter 102. For example, if the full scale value is to be 100 volts, an Output Voltage signal of five (5) volts would represent 100 volts, an Output Voltage signal of three (3) volts would represent 60 volts, an Output Voltage signal of one (1) volt would represent 20 volts, etc. However, the Output Limit Voltage signal acts as a limit on the output voltage, even if the power converter 102 can output a higher voltage. Thus, if the Output Limit Voltage signal is indicative of a maximum output of 60 volts, an Output Voltage signal of greater than three (3) volts would still represent only 60 volts. The Output Current (internal and external) and Output Current Limit signals operate in a similar manner. This feature prevents inadvertent control of the power converter 102 which would cause the power converter to exceed a maximum output current or voltage. Full Scale is defined by the power supply 102 (i.e., by the gain built (designed) into the power supply 102).

The control inputs are logical ON/OFF values and may include one or more of the following:

Local Turn On/Off (from Front Panel);
Remote Turn On/Off (from Host Computer);
Local Mode Voltage (from Front Panel);
Local Mode Current (from Front Panel);
Remote Mode Voltage (from wires to back panel or from Host Computer);
Remote Mode Current (from wires to back panel or from Host Computer);
Auto Remote Mode Voltage;
Auto Remote Mode Current;
Analog Internal Current;
Fast Output Discharge ON/OFF;
OVP Reset (LATCHED/UNLATCHED);
Loss of Power (LOCAL/LOCAL);
Loss of Power (REMOTE/REMOTE: 0V; 0I);
Loss of Power (A_REMOTE/A_REMOTE: Initial); and/or
Loss of Power (REMOTE/LOCAL).

The Local Mode, Remote Mode, and Auto Remote Mode signals for both the voltage and current serve to instruct the power processor 100 where to look for its settings upon startup or recovery from a power loss. For example, if the Local Mode signals are set, upon startup or recovery from a power loss, the power processor 100 will look to front panel settings (which are set, e.g., with potentiometers) for its voltage and current settings, i.e., return to local mode. If, on the other hand, the Remote Mode signals are set, upon startup or recovery from a power loss, the power processor 100 will look to signals provided from an external computer, via wires to its front or back panel, for its voltage and current settings. Finally, if the Auto Remote Mode signals are set, upon startup or recovery from a power loss, the power processor 100 will zero its initial voltage and current values, regardless of signals from an external A-computer or front panel settings, until these values are updated and the power supply is restarted.

Providing such an Auto Remote Mode procedure helps to protect the power processor 100. For example, suppose the power processor 100 is controlled by signals from an external computer which instructs the power processor 100 to supply 200 Amps to a load connected to the power processor 100. Also suppose that the power supply is connected to one circuit breaker while the computer is connected to another circuit breaker. Now suppose that the power supply is taken off-line, because of its circuit breaker opening for example, and in the meantime, the load is removed or the output terminals of the power processor shorted. If the power processor 100 is brought back on-line in the Remote Mode without a connected load, the power processor 100 will look to the computer for its setting. The computer will continue to instruct the power processor 100 to supply 200 Amps even though the load has been removed. This can destroy the power processor 100.

The power processor 100 provides measurement and monitoring outputs to an output device 130 via lines 132. These measurement and monitoring outputs can be provided to external systems. The measurement outputs are values scaled to zero (0) to five (5) volts, for example. The measurement outputs may include one or more of the following:

Output Voltage (Local);
Output Voltage (Remote);
Output Current (Local);
Output Current (Remote);
Overvoltage (Local);
Overvoltage (Remote);
Output Power (Local);
Voltage Potentiometer;
Current Potentiometer; and/or
Overvoltage Potentiometer.

Thus, for example, if the Output Voltage signal indicates that the power processor has failed, this signal can be used by an external device to switch to a battery backup.

The monitor outputs are logical PASS/FAIL values and may include one or more of the following:

Line Brown Out Voltage;
Line Frequency;
Line Phase;
Neutral Current;
Temperature;
Boost/Pre-Boost;
Local Mode;
Remote Mode;
Auto Remote Mode;
RS232 Interface;
IEEE488.2 Interface;
External Analog Voltage Programming;
External Analog Current Programming;
Master/Slave Condition;
Voltage/Current Mode; and/or
Inverter Temperature.

Of particular importance here are the Temperature and Inverter Temperature signals. If, for example, these signals indicate that the power processor 100 is in excess of a maximum temperature, the power processor 100 may be shut down or external cooling devices may be switched on.

The power processor 100 also outputs signals to indicators (e.g., front panel LEDs) via line(s) 114 and outputs signals to displays (e.g., a front panel LCD matrix) via line(s) 116. The signal output to indicators, via line(s) 114, are logical (e.g., GO/NO GO) signals while the signals output to displays, via line(s) 116, are signals based on actual values.

Figure 8:
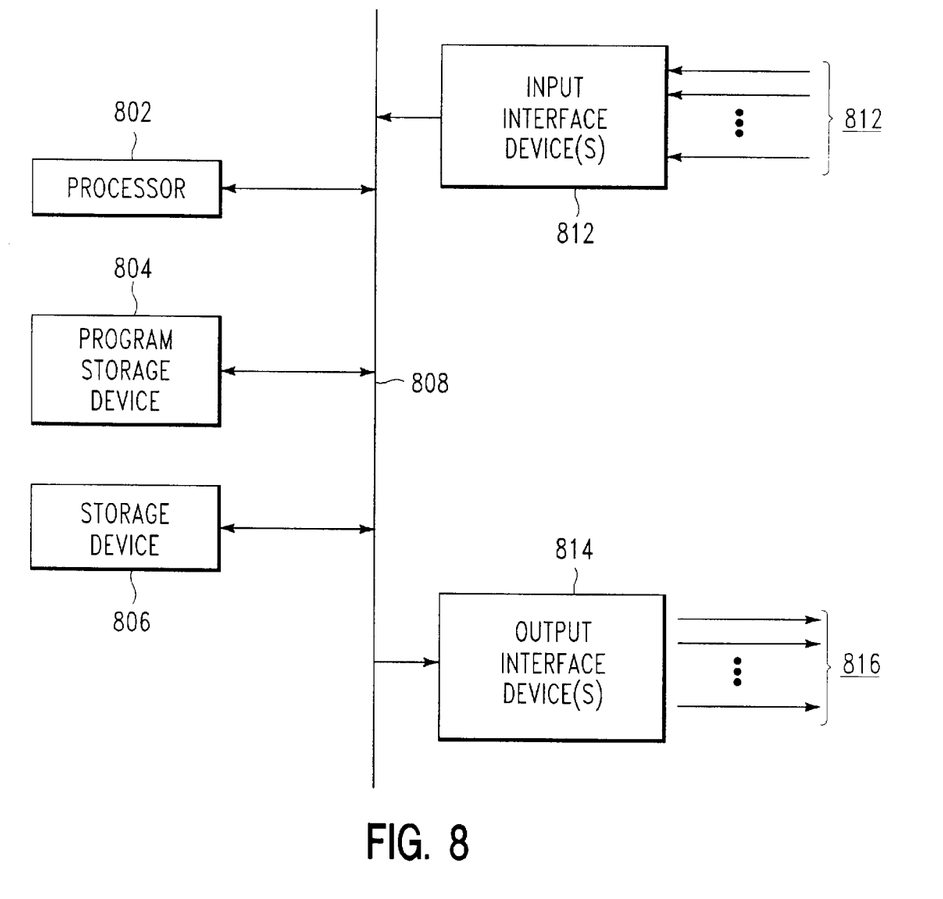
FIG. 8 is a high level block diagram of a sub-system of the power supply of the present invention.

FIG. 8 is a high level block diagram of a sub-system of the power supply of the present invention. A processor (e.g., a microprocessor) 802, a program storage device (e.g., a ROM for storing instructions for execution by the processor 802) 804, a storage device (e.g. a RAM and/or a disk storage device) 806, input interface device(s) 812, and output interface device(s) 814 are coupled via a shared bus 808. The input interface device(s) 812, which may include analog-to-digital converter(s), condition inputs 812 for communication over the shared bus 808. Such inputs 812 may, for example, include programming and control inputs 122, a power input (see FIG. 1), as well as certain ones of the measurement and monitoring outputs 132. The output interface devices 814, which may include digital-to-analog converter(s), condition data from the shared bus 808 for outputs 816. Such outputs 816 may include, for example, measurement and monitoring outputs 132, indicator signals 114, display signals 116, maintenance messages and/or alarms (discussed below), master enable signals (discussed below), and watchdog signals (discussed below).

Figure 2:
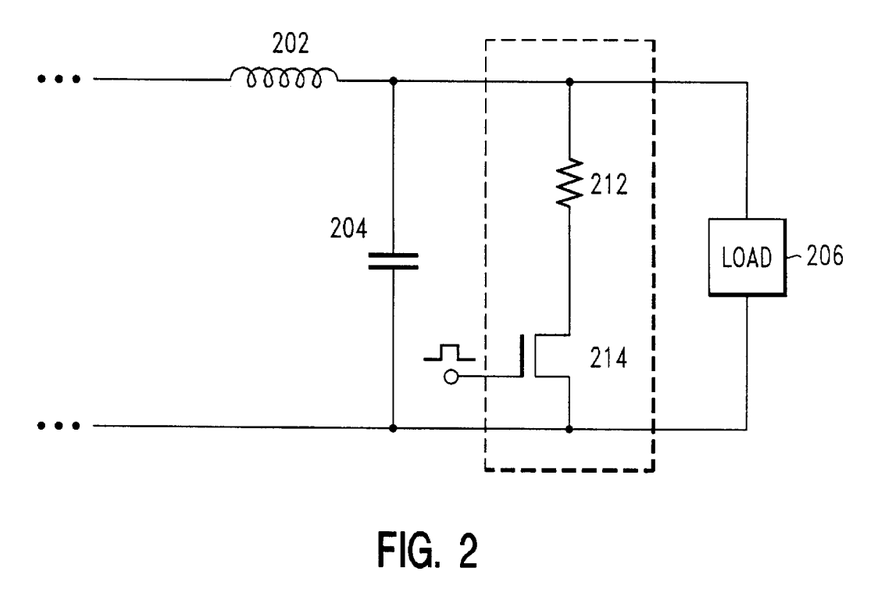
FIG. 2 is a schematic diagram of a circuit of the present invention for providing an automatic graceful shutdown.

FIG. 2 is a schematic diagram of a circuit of the present invention for providing an automatic graceful shutdown. For example, as mentioned in the "Background of the Invention" section above, typical power supplies have no shut down capabilities. When power is interrupted, the voltage on a relatively large output capacitor(s) goes to zero at a rate which depends on the load, often taking many seconds before the output capacitors are discharged. As discussed above, this slow discharge is unacceptable in many applications.

A portion of the output stage of the power supply of the present invention, including an output inductor 202 and an output capacitor 204, which provides power to an external load 206 is shown in FIG. 2. The output stage of the power processor 100 of the present invention further includes a series connection of a resistor 212 and a controllable switch 214 arranged across the output capacitor 204. The resistor 212 may be a 0.1 Ohm high power resistor and the controllable switch 214 may be a MOSFET 214, for example. Upon shut down of the power processor 100, the gate of the MOSFET 214 is provided with a pulse, having a programmable duration (e.g., one (1) to four (4) seconds). This permits charge on the output capacitor 204 to be discharged via the resistor 212 thereby protecting the load 206. Further, since the resistor 212 is only employed when needed (i.e., during a shut down of the power processor 100), energy is not wasted during normal operation as is the case with power supplies simply having a resistor provided across the output capacitor 204.

If the output current is to be less than 10 amps (i.e., in a low load application), the MOSFET 214 is driven in linear region such that some load is provided.

Figure 3:
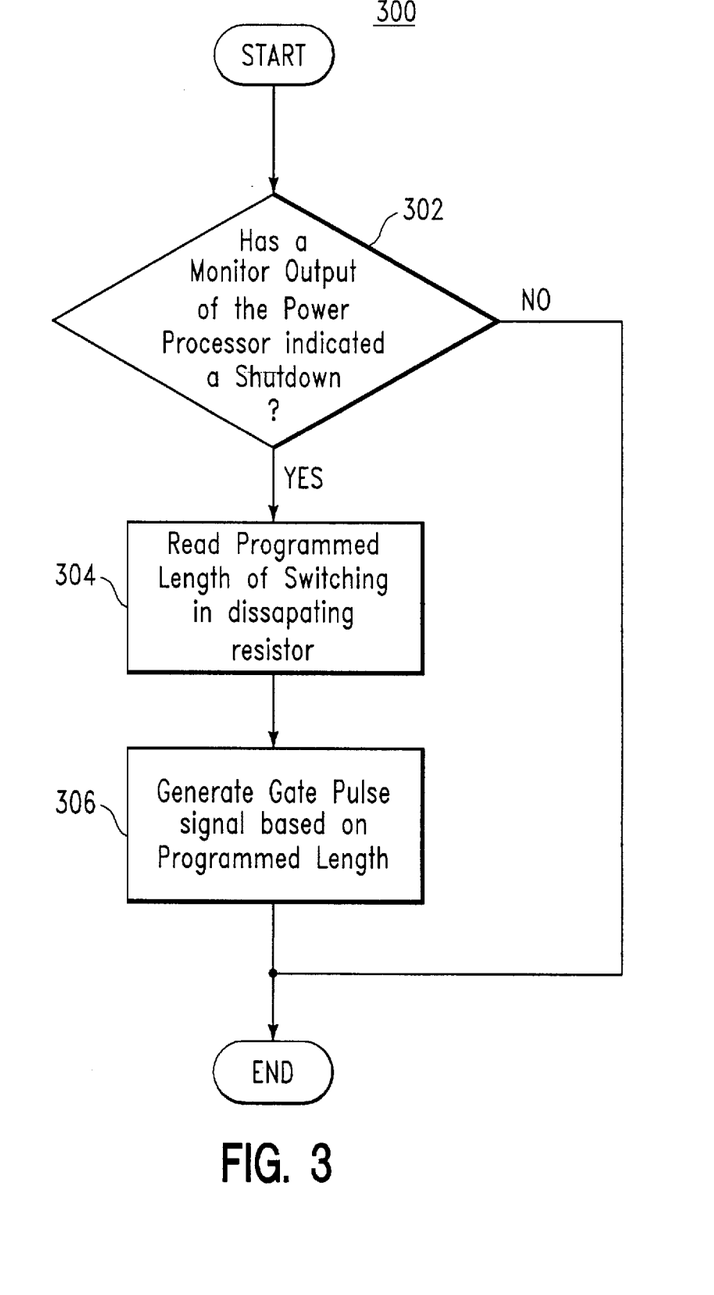
FIG. 3 is a flow diagram illustrating the graceful shutdown procedure of the present invention.

FIG. 3 is a flow diagram illustrating the graceful shutdown procedure 300 of the present invention. One or more of the Monitor signals provided to the output device 130 via line(s) 132 are checked to determine whether a shut down of the power processor 100 has occurred in step 302. If a shut down is indicated, a programmed length of switching in the dissipating resistor 212 is read out in step 304. Next, in step 306, a gate pulse signal, to be provided to the gate of MOSFET 214, is generated based on the programmed length read in step 304.

Figure 4A:
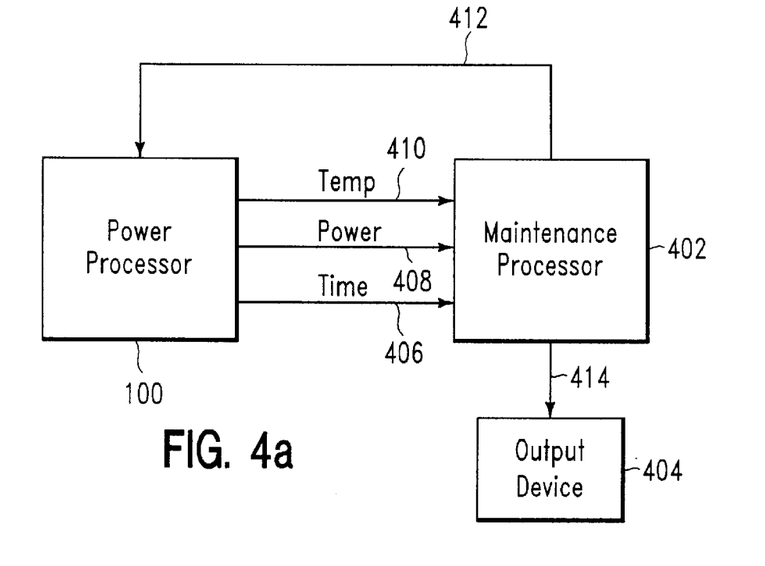
FIGS. 4a and 4b are high level block diagrams of a means for performing maintenance operations.
Figure 4B:
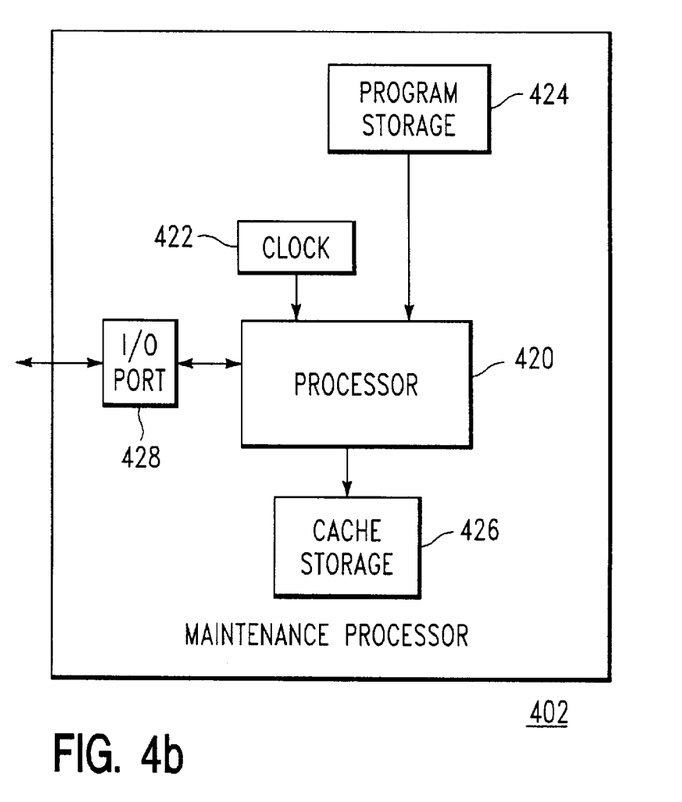

FIGS. 4a and 4b are high level block diagrams of a means for performing maintenance operations. As shown in FIG. 4a, the power processor 100 provides temperature, output power and operation time data to a maintenance processor 402 via data lines 410, 408, and 406, respectively. The data lines 410, 408, and 406 correspond to Measurement and Monitoring Signal output lines 132. The maintenance processor 402 can provide maintenance instructions and warnings to an output device 404 (such as a display terminal, an LED array, and/or an alarm, for example) via lead 414. The provision of the maintenance instructions and warnings from the maintenance processor 402 is based on one or more maintenance factors determined from the temperature, output power and operation time data. The maintenance processor 402 may sample or receive this data periodically (e.g., every ten (10) seconds). The maintenance processor 402 may also shut down the power processor 100 via lead 412 if continued operation of the power processor 100 becomes inadvisable or dangerous based on the temperature, output power, and/or operation time data.

FIG. 4b is a high level block diagram showing an example of a maintenance processor 402. As shown in FIG. 4b, the maintenance processor 402 may include a processor 420 for executing a maintenance procedure, a clock 422 for providing clock pulses to the processor 420, a program storage device 424 for storing the maintenance procedure to be executed by the processor 420, a cache storage 426 for use by the processor 420, and a input/output port 428 for permitting communication between the processor 420 and the power processor 100 and the output device 404.

Figure 5:
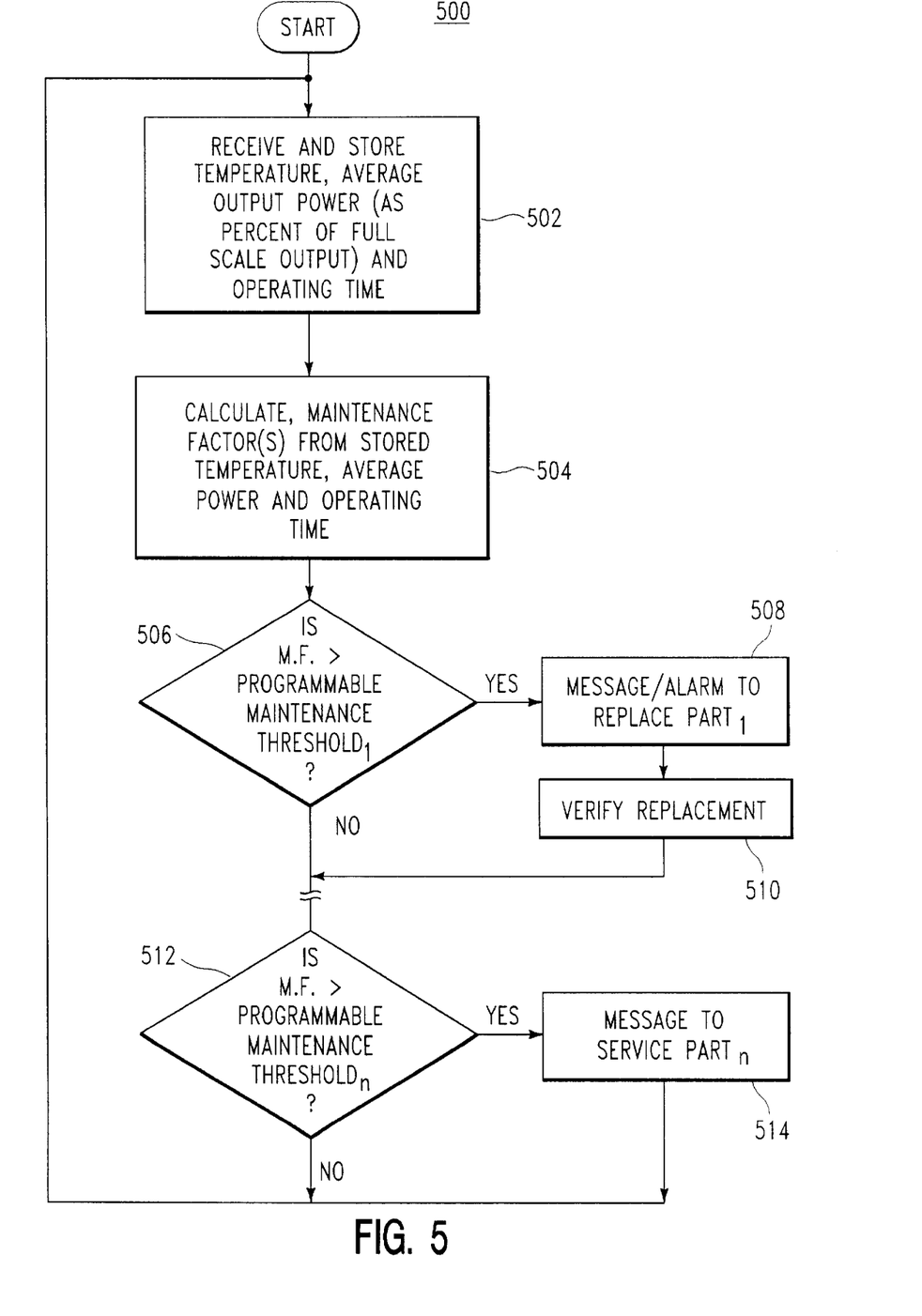
FIG. 5 is a flow diagram showing the age monitoring and maintenance procedure of the present invention.

An example of an age monitoring and maintenance procedure 500 stored in the program storage 424 and executed by the processor 420 is illustrated in the flow diagram of FIG. 5. This procedure 500 is run in the background during operation of the power processor 100. At step 502, the temperature of the power processor 100, the average output power of the power processor 100 (for example, as a percentage of full scale output of the power processor 100), and the operating time of the power processor 100 are received and stored. Next, in step 504, one or more maintenance factors are calculated from the received and stored temperature, average output power, and operating time values. The factor(s) and/or values may be updated from previously stored values. For example, the operating time of the power processor is based on an operating time summed over the life of the power processor 100 and a present operating time. The maintenance factor(s) may be determined based on a simple product of the output power, temperature, and operating time, or more complex calculations in which the values are scaled and/or exponentially raised. The maintenance factor(s) should account for previously replaced parts and previously performed servicing.

Next, the maintenance factors are compared with programmable maintenance thresholds. Although only two (2) such comparisons (steps 506 and 512) are shown in FIG. 5, an actual maintenance procedure 500 would typically include many more comparisons. As used here, the term comparison can include greater than, less than, and/or equal to. As shown in steps 506 and 508, if a maintenance factor (M.F.) is greater than a first programmable maintenance threshold, a message and/or alarm is invoked to indicate that a part (e.g., a cooling fan or and electrolytic capacitor) should (or must) be replaced. In a preferred embodiment of the present invention, the replacement is verified, via operator entry or automatic check, in step 510. As shown in steps 512 and 514, if a maintenance factor (M.F.) is greater than an $n^{th}$ programmable threshold, a message is invoked to indicate that a part (e.g., a heat sink) must be serviced (e.g., cleaned). A verification step similar to that performed in step 510 may follow step 514. After all comparisons are made, the control of the maintenance procedure 500 is returned to step 502.

Figure 6A:
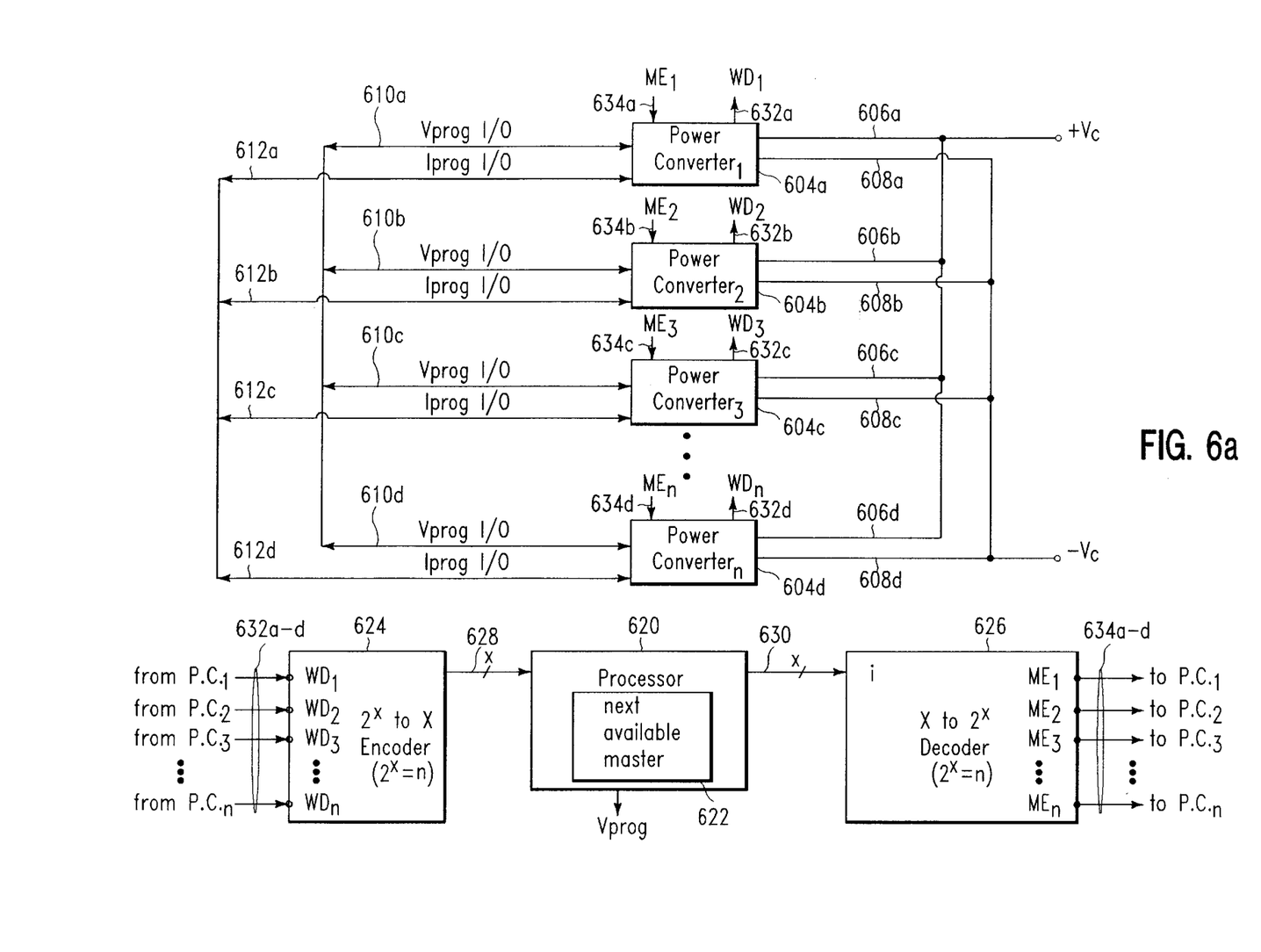
FIG. 6a is a block schematic showing a master-slave arrangement of N power converters and a processor which permit an intelligent reconfiguration of the power converters if the master power converter fails.

FIG. 6a is a block schematic showing a master-slave arrangement of N power converters 604 (or power processors 100) and a processor 620 which permits an intelligent reconfiguration of the power converters 604 if the master power converter fails.

Each of the N power converters 604 includes a positive output voltage terminal 606 and a negative output voltage terminal 608. Each of the positive output voltage terminals 606a through 606d are electrically coupled to a positive output voltage terminal $+V_c$ and each of the negative output voltage terminals 608a through 608d are electrically coupled to a negative output voltage terminal $-V_c$. Thus, each of the power converters 604 provides a portion of current sourced to a load arranged between the positive and negative output voltage terminals.

Each of the power converters 604 also includes a programmable voltage input/output terminal ($V_{prog}$ I/O) 610 and a programmable current input/output terminal ($I_{prog}$ I/O) 612. The value provided at the $V_{prog}$ I/O terminals 610 is an analog voltage signal ranging from zero (0) volts to five (5) volts, where a five (5) volt signal corresponds to a full scale voltage. This signal is determined based on an operator programmable input provided at input device 120. The value provided on the $I_{prog}$ I/O terminals 612 is also an analog voltage signal ranging from zero (0) to five (5) volts.

Further, each of the power converters 604 includes a master enable input (ME) 634. The signal provided on the master enable input (ME) 634 is a logical signal having a HIGH state (e.g., five (5) volts) and a LOW state (e.g., zero (0) volts). When the (ME) signal 634 is at a first of the HIGH and LOW states, the corresponding power converter 604 is instructed to act as a master programmable controller and when the (ME) signal 634 is at a second of the HIGH and LOW states, the corresponding power converter 604 is instructed to act as a slave programmable controller.

Finally, each of the power converters 604 is provided with a watchdog output terminal (WD) 632. The signal (WD) provided on the watchdog output terminal 632 is a logical signal having a HIGH state and a LOW state. When the watchdog signal (WD) is at a first of the HIGH and LOW states, a failure of the corresponding power converter 604 is indicated. The watchdog signal (WD) can be generated by logically "OR"ing a number of watchdog signals, such as an overtemperature signal, a power failure signal, a loss of control signal, and a component failure signal, for example. The generation of such signals is known to those skilled in the art.

The processor 620 receives a x-bit digital signal from an encoder 624 via line(s) 628. The encoder 624 encodes N (WD) signals 623 provided from the N power converters 604 to form the x-bit data signal. The x-bit digital signal is indicative of the status (pass/fail) of each of the N power converts 604 (i.e., indicative of the system health). Based on the x-bit digital signal, the processor 620 determines the first slave processor 604 having an active (or pass) status, and stores the address of (or data indicating) the first active slave processor 604 as a next available master in register 622. This allows the processor 620 to assign a new power converter 604 as a master power converter when a current master power converter fails.

Whether a power converter 604 is a master or a slave is determined based on the master enable (ME) signal provided at its terminal 634. Generally, only one of the power converters (e.g., 604a) serves as a master at any given time, while the remaining N–1 power converters (e.g., 604b through 604d) serve as slaves. The processor 620 controls the master/slave status of each of the power converters 604 with a second x-bit digital signal which is provided to a decoder 626 via line(s) 630. The decoder converts the x-bit digital signal into N master enable (ME) signals.

Figure 6B:
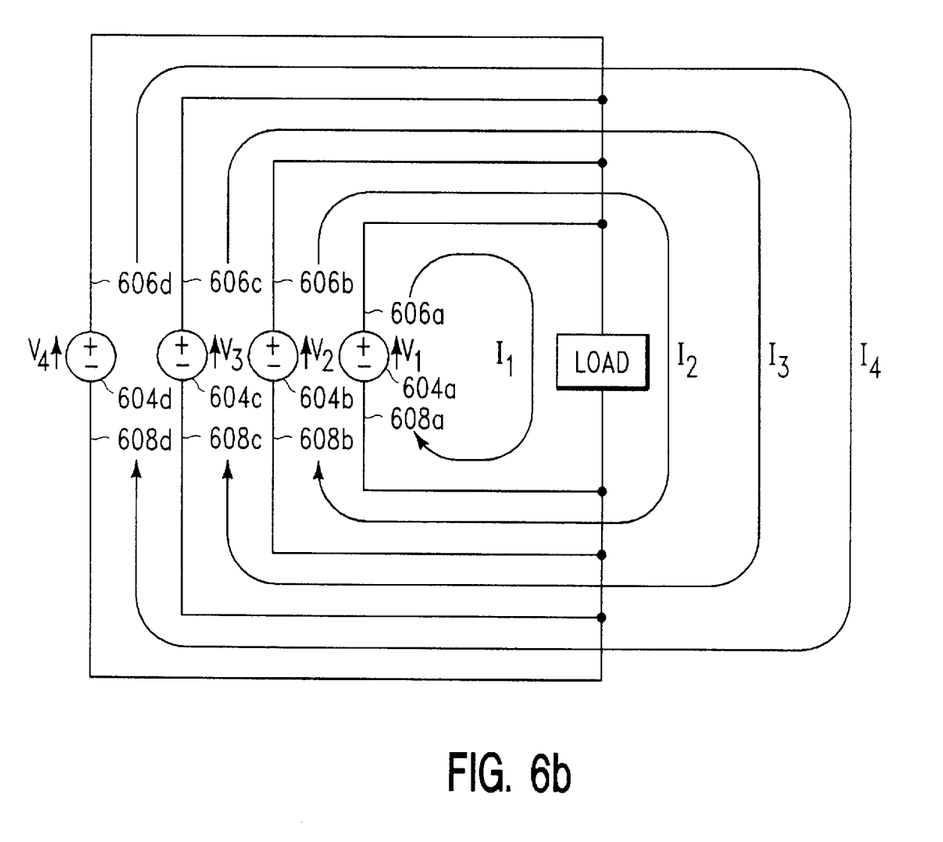

The operation of the master and slave power converters 604 is explained with reference to FIG. 6b. As shown in FIG. 6b, each of the power converters is coupled to a positive voltage output terminal via lead 606 and a negative voltage output terminal via lead 608. As can further be seen from FIG. 6b, the voltages applied by each of the power supplies are equal. That is, the voltage across the load $V_{load}=V_1=V_2=V_3=V_4$. Furthermore, the current through the load $I_{load}$ is equal to the sum of the currents $I_1$, $I_2$, and $I_4$. Moreover, the current through the load $I_{load}$ varies as the load varies. Ideally, all of the power converters 604 should source the same current to the load such that $I_{load}=4I_1=4I_2=4I_3=4I_4$. This matched current sourcing by the power converters 604 is accomplished as described below with reference to FIG. 6a.

In the following example, it is assumed that the power converter 604a serves as a master while power converters 604b through 604d serve as slaves. Thus, the master enable of the power converter 604a (ME$_1$) 634a is set to a first state (e.g., high) while the master enables of the power converters 604b through 604d (ME$_2$ through ME$_N$) 634b through 634d, respectively, are set to a second state (e.g., low). Recall that the power processor 100 provides an Output Current measurement value as a scaled value between zero (0) and five (5) volts. Recall also that the power processor 100 receives an Output Current programming value as a scaled value between zero (0) and five (5) volts. When a power converter 604 acts as a master, its $I_{prog}$ I/O port provides a scaled zero (0) to five (5) volt signal corresponding to the Output Current measurement value. On the other hand, when a power converter 604 acts as a slave, its $I_{prog}$ I/O port accepts the scaled zero (0) to five (5) volt signal as its Output Current programming value. Thus, the master controller 604a monitors its current, and provides a signal indicative of the monitored current as an input to the slave controllers 604b through 604d. This permits the power converters 604 to source the same current to a load.

Figure 7:
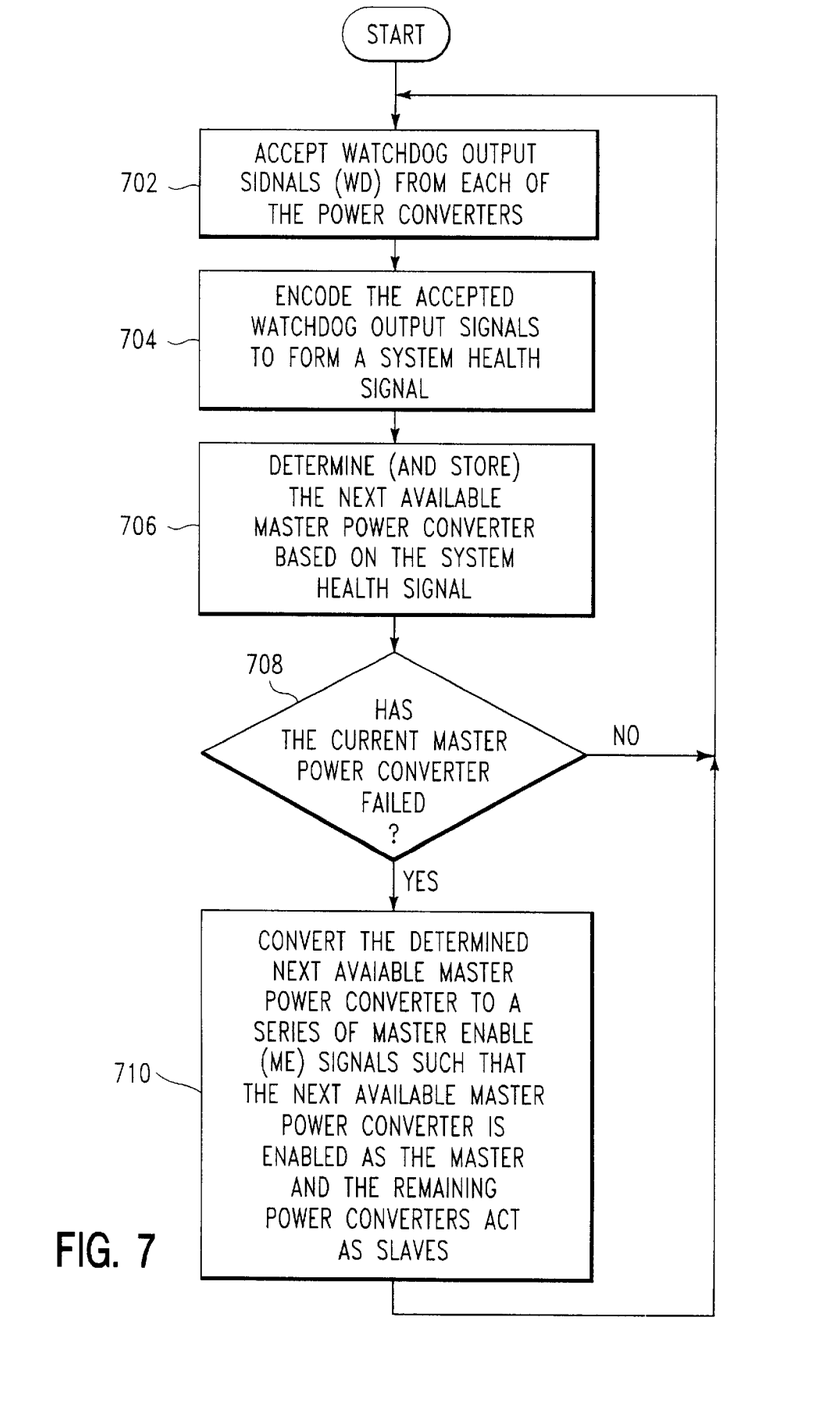
FIG. 7 is a flow diagram showing the intelligent reconfiguration process of the present invention.

The intelligent reconfiguration of the power converters 604 of FIG. 6a, upon the failure of the master power converter 604a, is described with reference to FIG. 7. FIG. 7 is a flow diagram showing the intelligent reconfiguration process 700 of the present invention. In the first step 702, the watchdog output signals (WD$_1$ through WD$_N$) are accepted from each of the N power converters 604. Next, in step 704, the accepted watchdog output signals (WD$_1$ through WD$_N$) are encoded to form a system health signal. This step may be performed within the processor 620, or optionally, by a $2^x$ to X encoder 624 (where $2^x \geq N$). In the latter case, the encoder 624 provides an x-bit signal to the processor 620 via line(s) 628. Next, in step 706, the next available master power converter is determined based on the system health signal. The processor 620 may determine (and store) the next available master power converter in a register 622. Next, in step 708, whether or not the current master power converter has failed is determined, also based on the system health signal. If the current master power converter has not failed, control is returned to step 702. If, on the other hand, the current master power converter has failed, in step 710, the determined next available master power converter information is converted into a series of master enable signals (ME$_1$ through ME$_N$) and provided to the power converters such that the next available master power converter is enabled as the master and the remaining power converters act as slaves. This step may be performed within the processor 620, or optionally, by an X to $2^x$ decoder 626. Control is then returned to step 702.

What is claimed is:

1. A programmable power converter comprising:
   a) a power converter for converting an input power to an output power;
   b) a controller for controlling a gain of the power converter based on a sensed output of the power converter;
   c) an input device, the input device receiving scaled analog inputs and control inputs; and
   d) an output device providing scaled measurement analog outputs and monitor outputs,
   wherein the scaled analog inputs received by the input device include a first scaled signal representing a desired output voltage, a second scaled signal representing an output voltage limit, a third scaled signal representing a desired output current, and a fourth scaled signal representing an output current limit.

2. The programmable power converter of claim 1 wherein each of the first, second, third, and fourth scaled analog inputs received by the input device vary between 0 and 5 volts.

3. The programmable power converter of claim 1 wherein the control inputs received by the input device include a first ON/OFF signal for determining whether the first scaled signal is taken from a front panel setting or an external source, a second ON/OFF signal for determining whether the second scaled signal is taken from a front panel setting or the external source, a third ON/OFF signal for determining whether the third scaled signal is taken from a front panel setting or the external source, and a fourth ON/OFF signal for determining whether the fourth scaled signal is taken from a front panel setting or the external source.

4. A programmable power converter comprising:
   a) a power converter for converting an input power to an output power;
   b) a controller for controlling a gain of the power converter based on a sensed output of the power converter;
   c) an input device, the input device receiving scaled analog inputs and control inputs; and
   d) an output device providing scaled measurement analog outputs and monitor outputs,
   wherein the scaled analog inputs received by the input device include at least one scaled signal representing information selected from a group consisting of: (i) desired output voltage; (ii) desired output current; (iii) program read back voltage gain; (iv) program read back current gain; (v) output voltage limit; (vi) output current limit; (vii) output over-voltage limit; (viii) output power limit; and (ix) over-voltage.

5. A programmable power converter comprising:
   a) a power converter for converting an input power to an output power;
   b) a controller for controlling a gain of the power converter based on a sensed output of the power converter;
   c) an input device, the input device receiving scaled analog inputs and control inputs; and
   d) an output device providing scaled measurement analog outputs and monitor outputs,
   wherein the scaled measurement analog outputs provided by the output device includes a first scaled output representing output voltage and a second scaled output representing output current.

6. A programmable power converter comprising:
   a) a power converter for converting an input power to an output power;
   b) a controller for controlling a gain of the power converter based on a sensed output of the power converter;
   c) an input device, the input device receiving scaled analog inputs and control inputs; and
   d) an output device providing scaled measurement analog outputs and monitor outputs,
   wherein the monitor outputs provided by the output device include PASS/FAIL or ON/OFF indications for at least one parameter selected from a group consisting of: (i) line brown out voltage; (ii) line frequency; (iii)

line phase; (iv) neutral current; (v) temperature; (vi) local mode; (vii) remote mode; (viii) auto remote mode; (ix) RS232 interface; (x) IEEE488.2 interface; (xi) external analog voltage programming; (xii) external analog current programming; (xiii) master/slave condition; (xiv) voltage/current mode; and (xv) inverter temperature.

7. A programmable power converter comprising:
   a) a power converter for converting an input power to an output power;
   b) a controller for controlling a gain of the power converter based on a sensed output of the power converter;
   c) an input device, the input device receiving scaled analog inputs and control inputs; and
   d) an output device providing scaled measurement analog outputs and monitor outputs,
   wherein the output device further provides GO/NO-GO indicator signals and display signals.

8. A programmable power converter comprising:
   a) a power converter for converting an input power to an output power;
   b) a controller for controlling a gain of the power converter based on a sensed output of the power converter;
   c) an input device, the input device receiving scaled analog inputs and control inputs;
   d) an output device providing scaled measurement analog outputs and monitor outputs;
   e) an input device for receiving temperature, average output power, and operating time from the power supply;
   f) a storage device for storing the temperature, average output power, and operating time received from the input device;
   g) a maintenance factor generator for determining at least one maintenance factor from the stored temperature, average output power, and operating time;
   h) a comparison device for comparing the at least one maintenance factor with at least one maintenance threshold; and
   i) an output device providing at least one of (i) a message and (ii) an alarm when the at least one maintenance factor is greater than the at least one maintenance threshold.

9. A system for providing power to a load, the system comprising:
   a) a plurality of power converters, each of the plurality of power converters having:
      i) a positive output voltage terminal coupled with the load;
      ii) a negative output voltage terminal coupled with the load;
      iii) a master enable input for accepting a master enable signal corresponding to the particular power converter;
      iv) a watchdog signal output; and
      v) a programmable voltage input/output terminal for providing a scaled signal representing its output voltage if enabled as a master and for receiving a scaled signal representing a desired output voltage if a slave; and
   b) a processor, the processor
      i) receiving a watchdog signal from each of the plurality of power converters,
      ii) determining a next available master power converter based on the received watchdog signals, and
      iii) providing master enable signals to each of the plurality of power converters, wherein one of the master enable signals has a first state for enabling the power converter associated with it to act as a master, and wherein a remainder of the master enable signals have a second state for making the power converters associated with these signals slaves.

10. The system of claim 9 wherein, if the watchdog signal output by the power converter enabled as the master indicates a failure, the processor
    i) provides a master enable signal of the first state to the next available master power converter, and
    ii) provides a master enable signal of the second state to the power converter previously enabled as the master.

11. A system for providing power to a load, the system comprising:
    a) a plurality of power converters, each of the plurality of power converters having:
       i) a positive output voltage terminal coupled with the load;
       ii) a negative output voltage terminal coupled with the load;
       iii) a master enable input for accepting a master enable signal corresponding to the particular power converter;
       iv) a watchdog signal output;
       v) a programmable current input/output terminal for providing a scaled signal representing its output current if enabled as a master and for receiving a scaled signal representing a desired output current if a slave; and
    b) a processor, the processor
       i) receiving a watchdog signal from each of the plurality of power converters,
       ii) determining a next available master power converter based on the received watchdog signals, and
       iii) providing master enable signals to each of the plurality of power converters, wherein one of the master enable signals has a first state for enabling the power converter associated with it to act as a master, and wherein a remainder of the master enable signals have a second state for making the power converters associated with these signals slaves.

12. The system of claim 11 wherein, if the watchdog signal output by the power converter enabled as the master indicates a failure, the processor
    i) provides a master enable signal of the first state to the next available master power converter, and
    ii) provides a master enable signal of the second state to the power converter previously enabled as the master.

13. The system of claim 11 wherein each of the power converters further include:
    vi) a programmable voltage input/output terminal for providing a scaled signal representing its output voltage if enabled as a master and for receiving a scaled signal representing a desired output voltage if a slave.

* * * * *